United States Patent
Yang et al.

(10) Patent No.: US 7,333,472 B2
(45) Date of Patent: Feb. 19, 2008

(54) INTERNET PROTOCOL TELEPHONY EXCHANGE SYSTEM AND CALL CONTROL METHOD THEREOF

(75) Inventors: Doo-Yong Yang, Seoul (KR); Sung-Chul Hong, Suwon-shi (KR); Ha-Hong Kim, Seoul (KR); Tae-Hong Ahn, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1278 days.

(21) Appl. No.: 10/270,070

(22) Filed: Oct. 15, 2002

(65) Prior Publication Data
US 2003/0072330 A1    Apr. 17, 2003

(30) Foreign Application Priority Data
Oct. 13, 2001    (KR) ............... 2001-63192

(51) Int. Cl.
*H04L 12/66* (2006.01)
(52) U.S. Cl. .................. 370/352; 370/356; 379/220.01
(58) Field of Classification Search ........ 370/352–356, 370/360, 400; 379/219, 220.01, 221.01
See application file for complete search history.

(56) References Cited

FOREIGN PATENT DOCUMENTS

| EP | 1111893 A2 | 6/2001 |
|---|---|---|
| EP | 1133140 A2 | 9/2001 |
| WO | WO 01/06740 A2 | 1/2001 |

OTHER PUBLICATIONS

UK Search Report under §17 issued by The Patent Office on Mar. 7, 2003.
Bur Goode, "*Voice Over Internet Protocol (VoIP)*", IEEE, vol. 90, No. 9, pp. 1495-1517, Sep. 2002.

*Primary Examiner*—Suhan Ni
(74) *Attorney, Agent, or Firm*—Robert E. Bushnell, Esq.

(57) ABSTRACT

An Internet Protocol telephony exchange system and a call control method thereof. The exchange system integrates an IP terminal and a legacy terminal in a single exchange system, controls a call of the IP terminal in the same manner as an extension subscriber, and contains at least one IP terminal connected to the IP network. The IP terminal contains a user interface for generating user information or converting received user interface information into information of a user-identifiable state, and performs a VoIP function in compliance with one or more of a H.323, a MGCP and an SIP protocol procedure. The IP network is connected to an IP driver and an IP-PBX (Internet Protocol-Private Branch Exchange). The IP driver controls an IP end point at which the IP terminals are positioned, upon receiving IP terminal connection information and call control information based on H.323/MGCP/SIP protocol procedure.

20 Claims, 6 Drawing Sheets

INTERNET PROTOCOL TELEPHONY EXCHANGE SYSTEM AND CALL CONTROL METHOD THEREOF

CLAIM OF PRIORITY

This application makes reference to, incorporates the same herein, and claims all benefits accruing under 35 U.S.C § 119 from an application entitled Internet Protocol Telephony Exchange System And Call Control Method Thereof earlier filed in the Korean Industrial Property Office on Oct. 13, 2001, and there duly assigned Ser. No. 2001-63192 by that Office.

BACKGROUND OF THE INVENTION

1. Field of the Invention

The present invention relates to a private branch exchange system, and more particularly to an Internet protocol telephony exchange system.

2. Description of the Related Art

In these times, following the current trend of rapidly growing Internet technology, the need for various kinds of services is rapidly increasing and an IP-based network is also rapidly developing not only in the Internet performance aspect but also in the Internet service aspect. For instance, voice signal transmission over an IP network may be considered as one of a variety of services. A VoIP (Voice over Internet Protocol) supports such voice signal transmission over the IP network. The IP network is typically implemented in consideration of data transmission, but currently needs to be implemented in consideration of voice transmission as well as the data transmission.

Due to the aforementioned demands, integration between a universal legacy telecommunication and a VoIP is increasingly developing to enable the universal legacy telecommunication and the VoIP to interwork with a current communication network. The representative examples for this purpose are an IP-PBX (Internet Protocol-Private Branch Exchange) and an IP-Centrex, etc. Accordingly, a phone terminal usable in the IP network should be designed to perform the same operation as a prior PSTN (Public Switched Telephone Network) in the same format as the prior PSTN.

Presently, there are several kinds of common IP-phone protocols, that is, H.323 recommended by an ITU-T (International Telecommunication Union-Telecommunication) Standardization Sector, a media gateway control protocol (MGCP) used between a media gateway and a media gateway controller for controlling the media gateway and a SIP (Session Initiation Protocol) being multimedia telecommunication standards for data, voice, and video signals.

Typically, an IP network and a PSTN are spaced apart from each other, and terminals accessible to each network are controlled in different protocols and characteristics. For example, a terminal accessible to the PSTN may be an analog telephone, a digital telephone, and a MODEM (Modulator-Demodulator), etc. A terminal accessible to a trunk may be an E1/T1, a primary rate interface (PRI), a loop and a No. 7 signaling, etc. An IP terminal accessible to the IP network may be a H.323 terminal, a MGCP terminal, and a SIP terminal, etc. In order to perform voice transmission/reception using the IP terminal and an IP network, the IP terminal and the IP network should be connected to an IP line over a LAN (Local Area Network) and a gate keeper.

In order to establish communication between a subscriber of the IP network and a subscriber of the PSTN by enabling the IP network to interwork with the PSTN, at least one of many gateways is inevitably required, and an independent system configuration is also required to occupy such a gateway between the IP network and the PSTN. These requirements mean that the IP network and the PSTN respectively have an independent number system and an independent terminal management system. That is, the IP network and the PSTN are different in a number system and a terminal management system.

In the case where a common legacy terminal contained in a PSTN calls another common legacy terminal, it attempts to establish a call connection state by dialing a predetermined prefix according to a position (i.e., an intra-office call, a long-distance call, an international phone call, and a wired/wireless call) of a called party's terminal. However, in the case where the called party's terminal is an IP terminal, a corresponding legacy terminal needs to dial a specific prefix occupying a gateway connected to an exchange system in such a way that the legacy terminal can perform a call control.

The IP terminal connected to the IP network dials a predetermined prefix depending on a counterpart terminal's position (i.e., intra-office area or other area). In case of attempting a call for a PSTN, the IP terminal needs to dial a prefix used for occupying a gateway connected to an exchange system controlling a counterpart terminal.

However, the aforesaid conventional technique establishes an independent call control mode between a PSTN's terminal and an IP network's terminal, because the PSTN's terminal and the IP network's terminal are respectively designed to have independent systems. As a result, the PSTN's terminal and the IP network's terminal perform different functions independently from each other, so that it is difficult to accomplish integration of IP terminals within either a zone using a prior PSTN or one building. In other words, in case of implementing an IP-based PBX, the conventional technique cannot control a call of an IP terminal in such a PBX in the same manner as an extension subscriber, so that it cannot use a plurality of extension functions provided in the PBX.

SUMMARY OF THE INVENTION

Therefore, the present invention has been made in view of the above problems, and it is an object of the present invention to provide an Internet protocol telephony exchange system for assigning the same phone number system and the same maintenance system to both an IP terminal and a legacy terminal, and integrating the IP terminal and the legacy terminal into one system to provide a call service, and a call control method thereof.

It is another object of the present invention to provide an Internet protocol telephony exchange system for facilitating a call connection between IP terminals and/or between an IP terminal and a legacy terminal by establishing communication between an IP terminal and a call control module of a PBX, and a call control method thereof.

It is yet another object of the present invention to provide an Internet protocol telephony exchange system for integrating an IP terminal and a legacy terminal into one system to provide the same call connection service and function provided in a PBX, and giving the IP terminal and the legacy terminal a variety of functions, and a call control method thereof.

In accordance with the present invention, the above and other objects can be accomplished by the provision of an Internet protocol telephony exchange system connected to an IP (Internet Protocol) network and a PSTN (Public Switched Telephone Network), for performing call control services of legacy terminals and IP terminals by controlling an Internet protocol and an exchange call control procedure, comprising: at least one IP terminal connected to the IP network, for containing a user interface which generates user information or converts received user interface information into information of a user-identifiable state, and performing a VoIP (Voice over Internet Protocol) function in compliance with a H.323IMGCP/SIP protocol procedure; an IP driver connected to the IP network, for controlling an IP end point at which the IP terminals are positioned, upon receiving IP terminal connection information and call control information based on the H.323/MGCP/SIP protocol procedure; and an IP-PBX (Internet Protocol-Private Branch Exchange) including: a database having user subscriber information such as phone numbers of a plurality of legacy terminals and the IP terminals, port numbers, and IP address information, etc.; an exchange interface connected to the IP network, for receiving the user information from the IP terminals, and transmitting call control information to the IP driver and the IP terminals over the IP network; a gateway card connected to the IP network, for establishing a traffic channel between the IP terminals and the legacy terminals upon receiving IP terminal connection information based on the H.323IMGCP/SIP protocol procedure and call control information; and a call control module for searching the database on the basis of call origination information transmitted from the IP terminals and the legacy terminals, analyzing a termination-side number, and establishing a call connection service with the legacy terminals or the IP terminals via the exchange interface, the gateway card, and the IP driver.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 1:
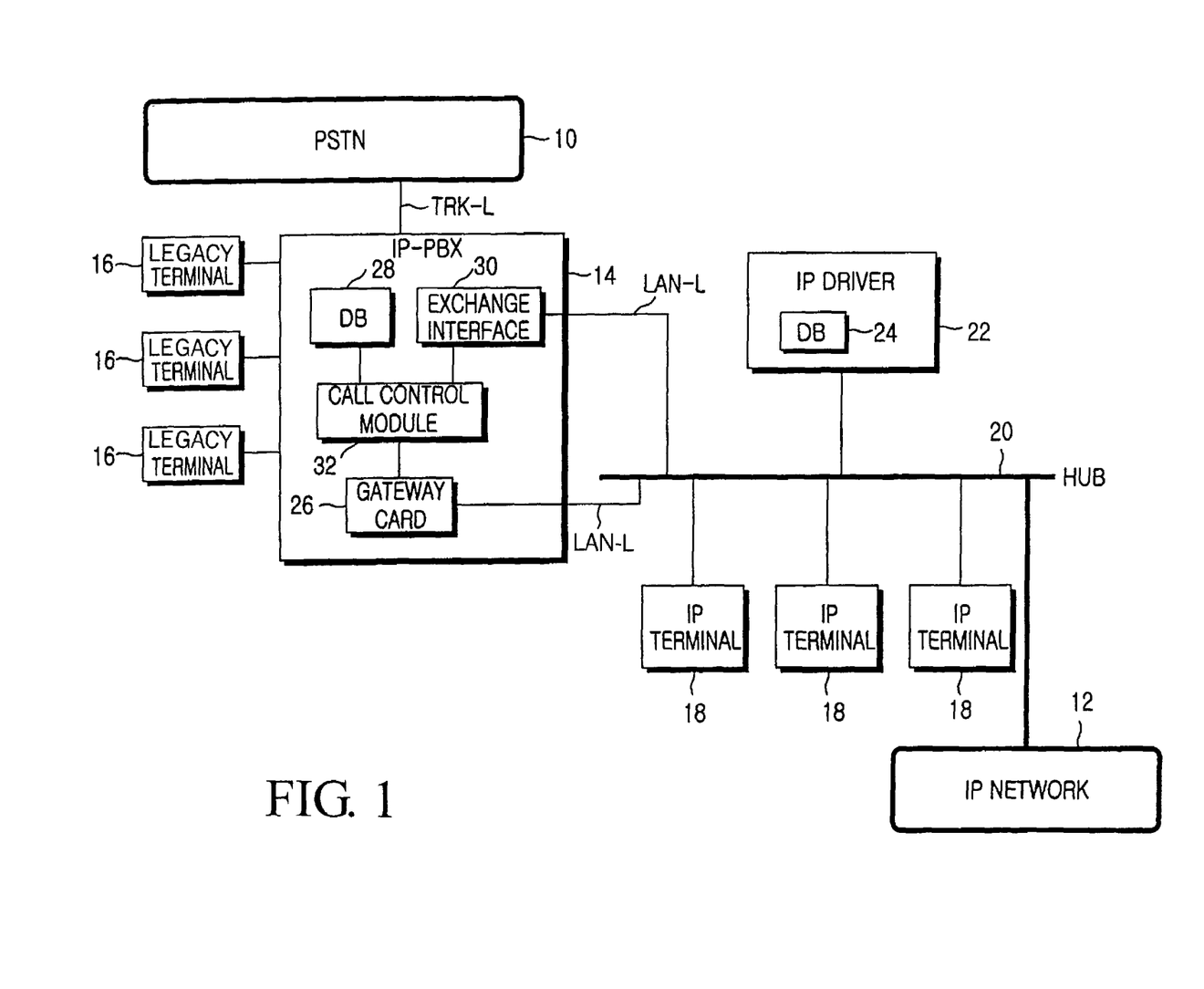
FIG. 1 is a view illustrating a block diagram of an Internet protocol telephony exchange system in accordance with a preferred embodiment of the present invention.

FIG. 1 is a view illustrating a block diagram of an Internet protocol telephony exchange system in accordance with a preferred embodiment of the present invention. Referring to FIG. 1, an IP-PBX 14 for basically switching call paths of a plurality of legacy terminals (such as analog or digital telephones) 16 is connected to a PSTN 10 via an office line trunk card (or a board circuit) (not shown). Such an office line trunk card is well known in the art as means for interfacing an E1/T1, a PRI (Primary Rate Interface), a BRI (Basic Rate Interface), and a No. 7 Signaling (SS7), etc., but it is not described in more detail in a preferred embodiment of the present invention. Also, a call path connection caused by call termination/origination of a legacy terminal such as an analog or digital telephone is also well known in the art. The scope of a preferred embodiment of the present invention will be limited to a call connection service between a legacy terminal 16 and an IP terminal 18, a call connection service between IP terminals, a call connection service from the legacy terminal 16 to an IP trunk, and a call connection service from the IP terminal 18 to an IP trunk. Such a call connection with the IP trunk means a VoIP connection over a gateway.

The Internet Protocol telephony exchange system according to the present invention includes an IP-PBX 14 connected to a PSTN 10 to perform a common call control service of a plurality of legacy terminals 16, and a plurality of IP terminals 18 and an IP driver 22 which are connected to the IP PBX 14 and an IP network 12. The IP-PBX 14 contains a gateway card 26 for interconnecting different kinds of communication networks. The gateway card 26 of the IP-PBX 14, the IP driver 22, and the IP terminals 18 have a plurality of LAN (local area network) ports, and are respectively connected to a LAN port of a hub 20 connected to the IP network 12. The hub 20 adopts a common switching hub, and switches a plurality of LAN devices connected to the LAN ports.

Besides the call control service of the common legacy terminals 16, the IP-PBX 14 has an additional function for executing a call control service in the same manner as an extension subscriber does with respect to even the IP terminals 18 connected to the IP network 12. Such a function of the IP-PBX 14 will hereinafter be described in more detail.

The IP-PBX 14 includes a gateway card 26, a database (DB) 28, an exchange interface 30, and a call control module 32. The database 28 stores phone numbers and port numbers of legacy terminals 16, and subscriber information (i.e., phone numbers, port numbers, and IP addresses) of the IP terminals 18 connected to the IP network 12 via a hub 20. The gateway card 26 forms a basic traffic channel between the IP network 12 and the PSTN 10. The exchange interface 30 receives call origination information transmitted from the IP terminals 18 connected to the hub 20, or transmits call termination information to the IP terminals 18. The call control module 32 controls a call control service between the legacy terminals 16 and the IP terminals 18. Also, the exchange interface 30 and the gateway card 26 respectively include a LAN port to establish LAN communication via the hub 20.

The IP terminals 18 respectively contain a user interface (not shown) and a communication module (not shown). The user interface generates a phone number and a port number assigned from the IP-PBX 14, hook state information having an ID code such as an IP address, and user information such as a dialing digit, etc. Otherwise, upon receiving various kinds of tone messages such as a dialing tone, a ring tone, and a busy tone (also known as a ring-back tone), and user interface information such as a variety of display information messages and commands, the IP terminals 18 generate a variety of tones or displays for a user's recognition. The user information and the user IP interface information establish signal transmission/reception with the IP-PBX 14 over a LAN line (LAN-L) via a hub 20. The communication module is connected to the IP network 12, and performs a VoIP function in compliance with one or more of the H.323, MGCP and SIP protocol procedures.

In case of picking up a phone (also known as an off-hook operation), the IP terminals 18 transmit an ID code assigned from the IP-PBX 14, for example, user information concerning a phone number and a port number, to an exchange interface 30 of the IP-PBX 14 via a hub 20. User information data for executing direct transmission/reception with the IP-PBX 14 via the exchange interface 30 includes an ID code, a dial on/off message, digit information, and various kinds of information for controlling a terminal.

An IP driver 22 connected to both the IP-PBX 14 and the IP terminals 18 via a hub 20 functions as a gate keeper, contains a database (DB) 24, and controls IP end points of the IP terminals 18 according to IP terminal connection information and call control information based on H.323/MGCP/SIP protocol procedures.

The aforementioned Internet protocol telephony exchange system gives a phone number and various subscriber information to each IP terminal 18 connected to the IP network 12 via a hub 20 as if the phone number and various subscriber information were assigned to legacy terminals 16, thereby facilitating addition/modification/deletion operations of the subscriber information. For example, the Internet protocol telephony exchange system loads various information, such as phone numbers, port numbers, and IP addresses, etc., for each IP terminal 18 in a database DB 28 by adopting a maintenance terminal (not shown), and also manages the information stored in the database 28 using the maintenance terminal. Therefore, the Internet protocol telephony exchange system shown in FIG. 1 provides a maintenance function not in the prior two independent systems but in a single integrated system. Namely, the Internet protocol telephony exchange system according to the present invention considers the IP terminals 18 and the legacy terminals 16 as terminals used in a single system, and thus controls them using just one system instead of two independent systems.

The Internet protocol telephony system shown in FIG. 1 determines a call control direction (i.e., a call control method) on the basis of information of a terminal in an off-hook state and call information retrieval of a counterpart terminal. For example, if one of the IP terminals enters an off-hook state, then a user interface of a corresponding IP terminal transmits ID codes, such as a phone number, a port number and an IP address, etc., received from an IP-PBX 14 to a call control module 32 of an IP-PBX 14 via an exchange interface 30. In this case, the call control module 32 provides user interface information, e.g., control data for generating a dial tone, a ring tone, and a ring-back tone and data for driving a variety of displays via the exchange interface 30 in such a way that all the signals applicable to extension subscribers of a common private exchange system are provided in the inventive Internet protocol telephony system. Herein, in the case where a calling party is an IP terminal storing information in its own database, an internal call control or a trunk outgoing control is selectively performed depending on a phone number of a called party.

Various kinds of call control operations of the Internet protocol telephony system shown in FIG. 1 will hereinafter be described with reference to FIGS. 2 to 6. A call control operation among legacy terminals 16 contained in the IP-PBX 14 is identical with that of a common exchange system, and thus will be omitted in the following description.

Call Control Between IP Terminals

Figure 2:
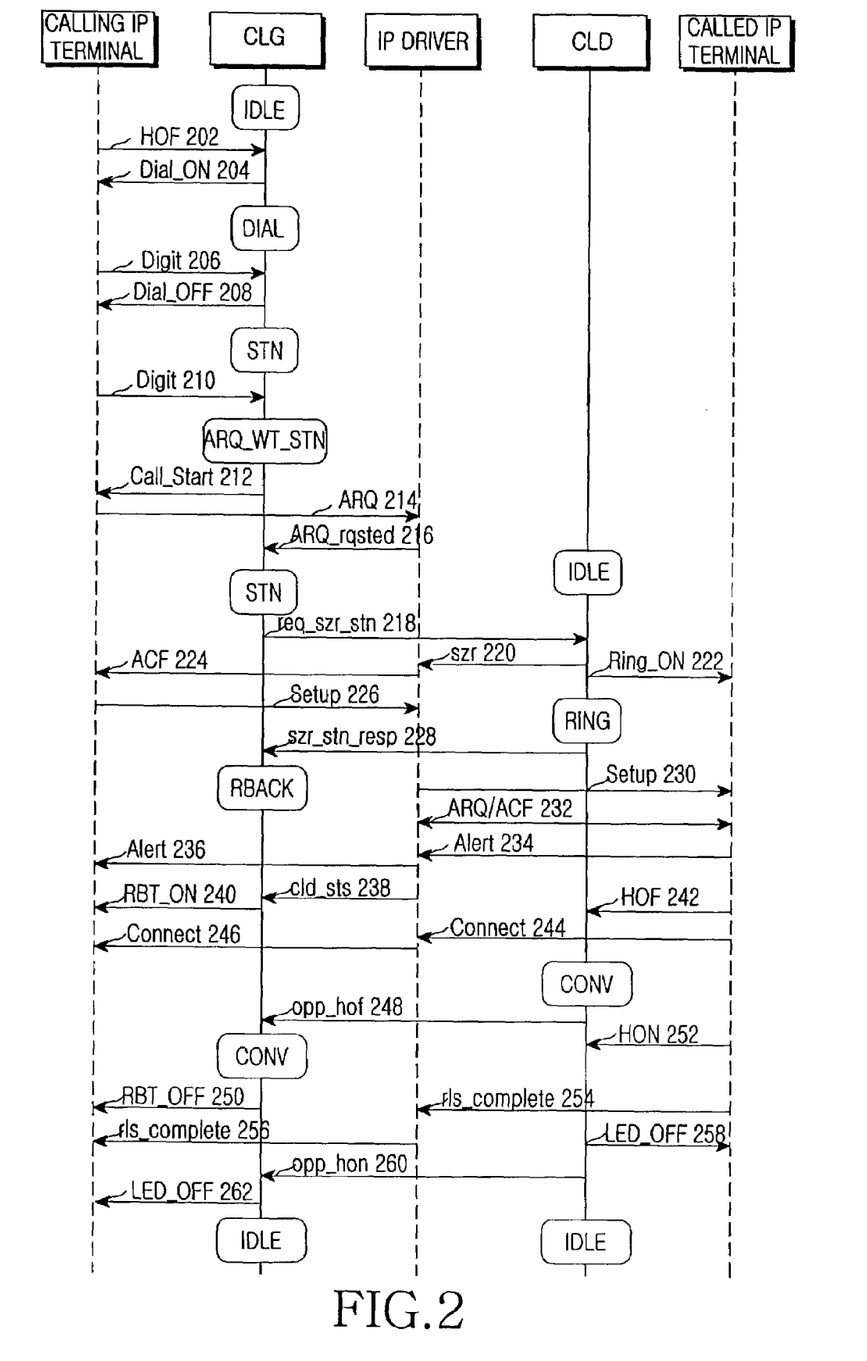
FIG. 2 is a flow chart illustrating a call control procedure of an Internet protocol telephony exchange system in case of establishing a call path between IP terminals in accordance with a preferred embodiment of the present invention.

A call control operation in case of establishing a call path between IP terminals 18 in an Internet protocol telephony exchange system shown in FIG. 1 will hereinafter be described with reference to FIG. 2 illustrating call control steps 202~262.

If one of IP terminals 18 enters an off-hook state as a calling IP terminal, then the calling IP terminal transmits an off-hook message HOF, at step 202, containing ID codes such as a phone number and a port number which are assigned an extension number of an IP-PBX 14 to an exchange interface 30 via a hub 20. In this way, the off-hook message HOF received in the exchange interface 30 is transmitted to an outgoing call controller CLG contained in a call control module 32.

If the outgoing call controller CLG initially in an idle mode IDLE receives the off-hook message HOF, then it determines which one of the IP terminals generates an outgoing call. In this case, the call controller CLG recognizes a calling IP terminal on the basis of IP codes (i.e., information such as a phone or port number). Thereafter, the outgoing call controller CLG transmits a dial tone on message Dial_ON to the calling IP terminal via an exchange interface 30 at step 204, and makes a transition from the IDLE mode to a dial mode DIAL. Herein, the calling IP terminal generates a dial tone depending on the received dial tone on message Dial_ON.

Thereafter, if a user dials a phone number of a counterpart IP terminal (i.e., a called IP terminal) using a keypad of the calling IP terminal, called number information Digit is transmitted from a calling IP terminal to the outgoing call controller CLG contained in the call control module 30 at step 206. Then, the outgoing call controller CLG transmits a dial tone OFF message Dial_OFF to the calling IP terminal at step 208, and makes a transition to an extension mode STN.

If the calling IP terminal continuously transmits the remaining digit information Digit to the outgoing call controller CLG at step 210, then the outgoing call controller CLG makes a transition to an ARQ (Admission Request) waiting extension mode ARQ_WT_STN.

Next, the outgoing call controller CLG transmits at step 212 dialing information being a call start message Call_Start having dialed digit information to the calling IP terminal. The call start message Call_Start is a message for commanding the calling IP terminal to transmit a VoIP call start message ARQ to an IP driver 22. Since the dialing information is contained in the call start message Call_Start, the dialing information can be equally applicable to a redialing or automatic dialing mode. As described above, the calling IP terminal for receiving the call start message Call_Start from the outgoing call controller CLG inside of a call control module 32 of the IP-PBX 14 transmits an ARQ message for calling a called IP terminal to the IP driver 22 at step 214.

Then, the IP driver 22 transmits an ARQ response message ARQ_requested to the outgoing call controller CLG inside of the IP-PBX 14 via the exchange interface 30 at step 216. The outgoing call controller CLG again makes a transition to the extension mode STN, and transmits an extension occupancy request message req_szr_stn to an incoming call controller CLD of the call control module 32 at step 218. The incoming call controller CLD, initially in a waiting mode IDLE, then transmits an extension occupancy message szr to the IP driver 22 at step 220, transmits a ring on message Ring_ON to the called IP terminal at step 222 and enters a ring mode RING. In this case, message transmission between the incoming call controller CLD and the called IP terminal is performed via the exchange interface 30. Also, the called IP terminal receiving the ring ON message Ring_ON from the incoming call controller CLD generates a bell sound by driving its own internal ringer.

The IP driver 22 receiving the extension occupancy message szr from the incoming call controller CLD transmits an ACF (Admission Confirm) message in response to the ARQ message to the calling IP terminal at step 224. The calling IP terminal transmits a call setup message Setup to the IP driver 22 at step 226. In this case, the incoming call controller CLD in the ring mode RING transmits, at step 228, an extension occupancy response message szr_stn_resp in response to the extension occupancy request message req_szr_stn (step 218) to the outgoing call controller CLG, and then the outgoing call controller CLG enters a ring-back tone mode RBACK.

In the meantime, the IP driver 22 receiving the setup message SETUP from the calling IP terminal performs steps 230~234 in compliance with the H.323 protocol, by transmitting a setup message Setup to the called IP terminal at step 230, receiving an ARQ/ACF message from the called IP terminal at step 232, and receives an alert message Alert from the called IP terminal at step 234, thereby establishing a call setup with the called IP terminal.

Then, the IP driver 22 transmits the alert message Alert to the calling IP terminal at step 236, and transmits a termination-side state message cld_sts to the outgoing call controller CLG at step 238. The termination-side state message cld_sts indicates whether a call termination side is in either a call connection state or an idle state.

The outgoing call controller CLG transmits a ring-back tone ON message RBT_ON at step 240 in the case (shown) where the termination-side state message cld_sts indicates an idle state. On the other hand, in the case where the termination-side state message cld_sts indicates a call connection state, the outgoing call controller CLG transmits a busy-tone on message (not shown) to the calling IP terminal.

Under the above condition, if the called IP terminal responds to a ring signal to perform an off-hook operation, then an off-hook message HOF is transmitted to the incoming call controller CLD at step 242. Subsequently, a connection message Connect is transmitted to the calling IP terminal via the IP driver 22 at steps 244 and 246.

The incoming call controller CLD then enters a conversation mode CONV, and transmits a counterpart off-hook message opp_hof to the outgoing call controller CLG at step 248. Then, after the outgoing call controller CLG enters the conversation mode CONV in response to the counterpart off-hook message opp_hof, it transmits a ring-back tone off message RBT_OFF to the calling IP terminal at step 250 to interrupt generation of ring-back tone.

In case of establishing a call connection from one IP terminal to another IP terminal contained in the IP-PBX 14 on the basis of the aforementioned operations, user information such as off-hook or dialing information of a calling IP terminal interworks with the IP-PBX 14 via an exchange interface 30, and is then received in a call control module 32 to analyze a counterpart phone number. In this case, a user interface of a called IP terminal is controlled by the exchange interface 30 because the counterpart terminal is an IP terminal, and then a call connection for voice communication is established via the IP driver 22. Herein, the voice communication is established between the calling IP terminal and the called IP terminal via hub 20.

As stated above, in the case where one of IP terminals enters an on-hook state during the call connection state between IP terminals 18, user information (i.e., an on-hook message) is generated from the corresponding IP terminal, and is transmitted to call control module 32 for controlling a corresponding call via exchange interface 30 inside of the IP-PBX 14.

For example (shown), in the case where the called IP terminal enters an on-hook state, an on-hook message HON is transmitted from the called IP terminal to the incoming call controller CLD of the call control module 32 at step 252, and the called IP terminal transmits a release complete message rls_complete to the IP driver 22 at step 254. Then, the IP driver 22 transmits the release complete message rls_complete to the calling IP terminal in compliance with a H.323 protocol procedure at step 256.

The incoming call controller CLD then transmits an LED (Light Emitting Diode) off message LED-OFF to the called IP terminal at step 258, transmits a counterpart on-hook message opp_hon to the outgoing call controller CLG at step 260 and makes a transition to an idle mode IDLE.

Upon receiving the counterpart on-hook message opp_hon from the incoming call controller CLD, the outgoing call controller CLG transmits an LED off message LED-OFF to the calling IP terminal at step 262 and enters an idle mode IDLE.

Call Control from IP Terminal to Legacy Terminal

Figure 3:
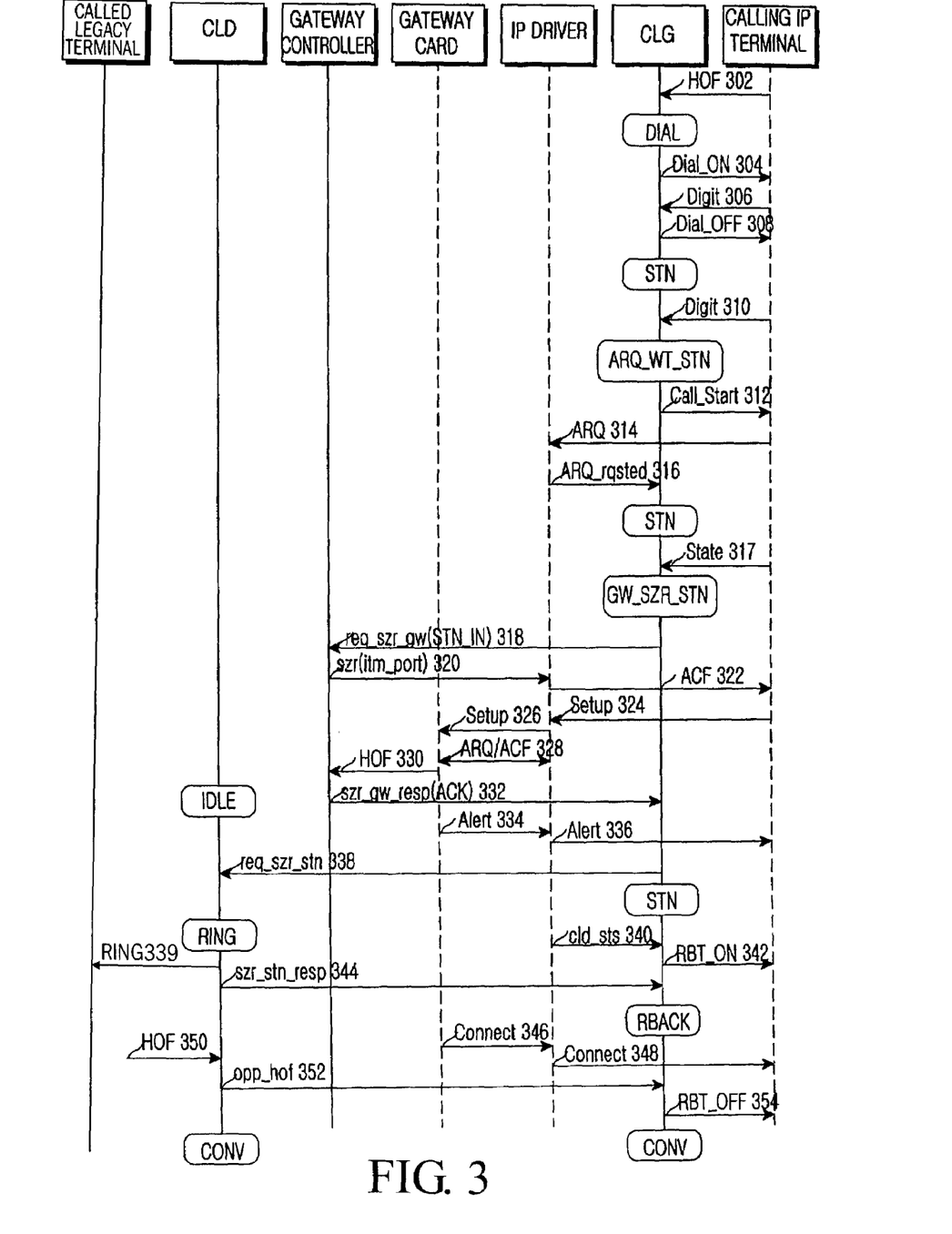
FIG. 3 is a flow chart illustrating a call control procedure of an Internet protocol telephony exchange system in case of establishing a call path from an IP terminal to a legacy terminal in accordance with a preferred embodiment of the present invention.

A call control operation in case of establishing a call path from IP terminals 18 to legacy terminals 16 in an Internet protocol telephony exchange system shown in FIG. 1 will hereinafter be described with reference to FIG. 3 illustrating call control steps 302~354.

If one of IP terminals 18 enters an off-hook state to establish voice communication with one of legacy terminals 16 connected to IP-PBX 14, the outgoing call controller CLG of call control module 32 of the IP-PBX 14 and a calling IP terminal perform steps 302~316 shown in FIG. 3 in the same manner as the above steps 202~216 shown in FIG. 2. If one of IP terminals 18 enters an off-hook state as a calling IP terminal, then the calling IP terminal transmits an off-hook message HOF, at step 302, containing ID codes such as a phone number and a port number which are assigned an extension number of an IP-PBX 14 to an exchange interface 30 via a hub 20. In this way, the off-hook message HOF received in the exchange interface 30 is transmitted to outgoing call controller CLG contained in call control module 32.

If the outgoing call controller CLG receives the off-hook message HOF, then it determines which one of the IP terminals generates an outgoing call. In this case, the call controller CLG recognizes a calling IP terminal on the basis of IP codes (i.e., information such as a phone or port number). Thereafter, the outgoing call controller CLG transmits a dial tone on message Dial_ON to the calling IP terminal via an exchange interface 30 at step 304, and makes a transition to a dial mode DIAL. Herein, the calling IP terminal generates a dial tone depending on the received dial tone on message Dial_ON.

Thereafter, if a user dials a phone number of a legacy terminal using a keypad of the calling IP terminal, called number information Digit is transmitted from a calling IP terminal to the outgoing call controller CLG contained in the call control module 30 at step 306. Then, the outgoing call controller CLG transmits a dial tone OFF message Dial_OFF to the calling IP terminal at step 308, and makes a transition to an extension mode STN.

If the calling IP terminal continuously transmits the remaining digit information Digit to the outgoing call controller CLG at step 310, then the outgoing call controller CLG makes a transition to an ARQ (Admission Request) waiting extension mode ARQ_WT_STN.

Next, the outgoing call controller CLG transmits at step 312 dialing information being a call start message Call_Start having dialed digit information to the calling IP terminal. The call start message Call_Start is a message for commanding the calling IP terminal to transmit a VoIP call start message ARQ to an IP driver 22. Since the dialing information is contained in the call start message Call_Start, the dialing information can be equally applicable to a redialing or automatic dialing mode. As described above, the calling IP terminal receiving the call start message Call_Start from the outgoing call controller CLG transmits an ARQ message for calling a called legacy terminal to the IP driver 22 at step 314. In this case, the IP driver 22 transmits an ARQ response message ARQ_rqsted to outgoing call controller CLG at step 316, and outgoing call controller CLG enters extension mode STN.

Thereafter, if the outgoing call controller CLG receives a state message State from the calling IP terminal at step 317, it enters a gateway occupancy extension mode GW_SZR_STN, and transmits a gateway channel occupancy request message req_szr_gw (STN_IN) to a gateway controller at step 318. The gateway channel occupancy request message req_szr_gw (STN_IN) is a message for occupying a gateway channel, and the gateway controller is a processor positioned in a gateway card 26.

The gateway controller occupies a gateway channel (or port) of an idle state in the gateway card 26, and transmits a gateway channel occupancy message szr(itm_port) to the IP driver 22 at step 320. Upon receiving the gateway channel occupancy message szr(itm_port), the IP driver 22 transmits an ACF (Admission Confirm) message to the calling IP terminal at step 322. The calling IP terminal transmits a setup message Setup to the IP driver 22 in compliance with the H.323 protocol at step 324, and the IP driver 22 transmits the setup message Setup to the gateway card 26 at step 326.

In accordance with the aforementioned steps, an ARQ/ACF message being an H.323 protocol is exchanged between the IP driver 22 and the gateway card 26 at step 328 in such a way that call control information is also exchanged between them. Then, if the gateway card 26 transmits an off-hook message HOF to a gateway controller at step 330, the gateway controller transmits, at step 332, a gateway occupancy response acknowledgment message szr_gw_resp (ACK) in response to the gateway channel occupancy request message req_szr_gw(STN_IN) to the outgoing call controller CLG, thereby informing the outgoing call controller CLG of gateway channel occupancy.

In this case, the gateway card 26 transmits an alert message Alert to the calling IP terminal via the IP driver 22 at steps 334 and 336. The outgoing call controller CLG transmits an extension occupancy request message req_szr_stn to the incoming call controller CLD at step 338, and then enters an extension mode STN.

At this time the incoming call controller CLD analyzes an extension occupancy request message req_szr_stn, enters a ring mode RING, and transmits, at step 339, a ring signal RING to a corresponding legacy terminal, i.e., the called legacy terminal, while the IP driver 22 transmits a termination-side state message cld_sts to the outgoing call controller CLG at step 340.

Upon receiving the termination-side state message cld_sts, the outgoing call controller CLG transmits a ring-back tone ON message RBT_ON to the calling IP terminal, and thereby enables the calling IP terminal to generate a ring-back tone. Then, if the incoming call controller CLD transmits an extension occupancy response message szr_stn_resp to the outgoing call controller CLG at step 344 in response to the extension occupancy request message req_szr_stn (step 338), then the outgoing call controller CLG enters a ring-back tone mode RBACK. Under this condition, if a connection message Connect is transmitted from the gateway card 26 to the IP driver 22 at step 346, then the IP driver 22 transmits the connection message Connect to the calling IP terminal at step 348, thereby completing a call connection state.

After completing a call setup between the calling IP terminal and the legacy terminal using the aforementioned operation, a called legacy terminal for generating a ring sound enters an off-hook state and then an off-hook message HOF is transmitted to the incoming call controller CLD at step 350. Then, the incoming call controller CLD transmits a counterpart off-hook message opp_hof to the outgoing call controller CLG at step 352, and enters a conversation mode CONV.

The outgoing call controller CLG transmits a ring-back tone off message RBT_OFF to the calling IP terminal via exchange interface 30 at step 354 in such a way that it interrupts generation of a ring-back tone and enters a conversation mode CONV. By the aforementioned operation, a call path between a calling IP terminal and a called legacy terminal is formed.

As described above, in case of establishing a call control operation from IP terminals 18 to legacy terminals 16 in an Internet protocol telephony exchange system in accordance with the present invention, user information such as off-hook/dialing information of a calling IP terminal is applied to an IP-PBX 14 via an exchange interface 30, and then a call control module 32 analyzes a counterpart phone number. The call control module 32 automatically occupies a gateway because the counterpart terminal is a legacy terminal 16, and recognizes a call termination provided in the legacy terminal 16. In this case, the IP terminal 18 attempts to make a call connection state upon receiving a control signal from the IP-PBX 14, and voice communication is performed between the IP terminal 18 and the legacy terminal 16 via a gateway card 26.

Call Control from Legacy Terminal to IP Terminal

Figure 4:
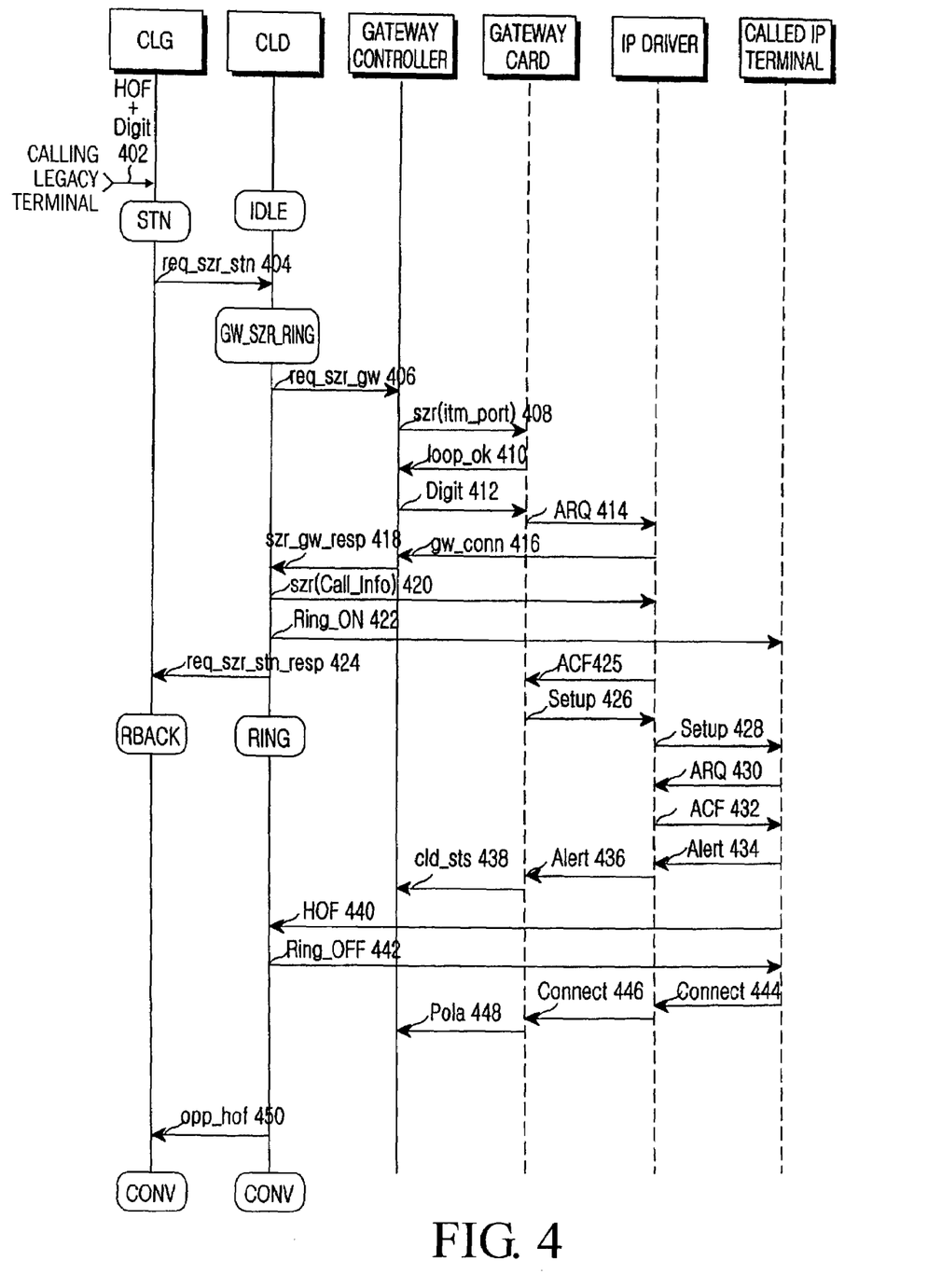
FIG. 4 is a flow chart illustrating a call control procedure of an Internet protocol telephony exchange system in case of establishing a call path from a legacy terminal to an IP terminal in accordance with a preferred embodiment of the present invention.

A call control operation in case of establishing a call path from legacy terminals 16 to IP terminals 18 in an Internet protocol telephony exchange system shown in FIG. 1 will hereinafter be described with reference to FIG. 4 illustrating call control steps 402~450. If at least one of legacy terminals 16 connected to an IP-PBX 14 enters an off-hook state and generates a dialing signal to communicate with one of IP terminals 18, an off-hook message HOF and dialed digit information Digit are transmitted to an outgoing call controller CLG inside of call control module 32 at step 402.

In this case, if a calling legacy terminal enters an off-hook state, the outgoing call controller CLG refers to a database DB 28 which stores information such as a port number and a phone number, etc. of a calling legacy terminal in the same manner as a common exchange system containing legacy terminals, so that the outgoing call controller CLG recognizes the information with reference to the database DB 28.

The outgoing call controller CLG, upon receipt of the off-hook message HOF and the digit information Digit from the calling legacy terminal, enters an extension mode STN, and transmits an extension occupancy request message req_szr_stn to the incoming call controller CLD at step 404. Then, the incoming call controller CLD, initially in an idle mode IDLE, analyzes the extension occupancy request message req_szr_stn to determine whether a called number is a legacy terminal or an IP terminal. If the called number is an IP terminal, the incoming call controller CLD enters a gateway channel occupancy mode GW_SZR_RING (shown), and transmits a gateway channel occupancy request message req_szr_gw to the gateway controller at step 406.

Thereafter, the gateway controller transmits a gateway channel occupancy message szr(itm_port) of an idle state to the gateway card 26 at step 408. The gateway card 26 transmits a loop message loop_ok to a gateway controller if there is a gateway channel of an idle state at step 410. Upon receiving the loop message loop_ok, the gateway controller transmits digit information Digit received from the incoming call controller CLD to the gateway card 26 at step 412. The gateway card 26 converts the received digit information Digit into a H.323 message and transmits an ARQ message to IP driver 22 at step 414.

The IP driver 22 receiving the ARQ message at step 414 transmits a gateway connection message gw_conn to the gateway controller at step 416. The gateway controller transmits a gateway channel occupancy response message szr_gw_resp to the incoming call controller CLD at step 418. The incoming call controller CLD transmits call information szr(Call_Info) to the IP driver 22 at step 420 via an exchange interface 30, and transmits a ring on message Ring_ON to the called IP terminal at step 422. The incoming call controller CLD transmits an extension occupancy request response message req_szr_stn_resp in response to the extension occupancy request message req_szr_stn to the outgoing call controller CLG at step 424, and enters a ring mode RING. Then, the outgoing call controller CLG controls a ring-back tone to be provided in the calling legacy terminal, thereby entering a ring-back tone mode RBACK.

In the meantime, gateway card 26, IP driver 22, and the called IP terminal perform call control steps 425~438 according to a H.323 protocol procedure regardless of operations of the IP-PBX 14, and thus forms a gateway channel of gateway card 26 and a channel to the called IP terminal. Here, in step 425, IP driver 22 transmits an ACF (Admission Confirm) message to the gateway card 22. The gateway card 22 transmits a setup message Setup to the IP driver 22 in compliance with the H.323 protocol at step 426, and the IP driver 22 transmits the setup message Setup to the called IP terminal 18 at step 428. The called IP terminal then transmits an ARQ (Admission Request) message to IP driver 22 and IP driver 22 responds by sending an ACF (Admission Confirm) message to the called IP terminal 18 in steps 430 and 432. In steps 434 and 436 an alert message Alert is transmitted to gateway card 26 via IP driver 22. Gateway card 26 then transmits a termination-side state message cld_sts to the gateway controller in step 438.

Under this condition, if a user of a called IP terminal receiving a ring sound takes an off-hook action, an off-hook message HOF of the called IP terminal is transmitted to the incoming call controller CLD inside call control module 32 via hub 20 and exchange interface 30. Then, the incoming call controller CLD transmits a ring-off message Ring_OFF to the called IP terminal via the exchange interface 30 at step 442 upon receiving the off-hook message HOF, and then the called IP terminal interrupts generation of the ring sound. In this case, the called IP terminal generates a connection message Connect in response to the ring-off message Ring OFF. The connect message Connect is transmitted to the IP driver 22 and the gateway card 26 over the hub 20 and a LAN network at steps 444 and 446. The gateway card 26 receiving the connect message Connect transmits a polarity message Pola to a gateway controller at step 448. The polarity message Pola is adapted to indicate a call control state in the IP driver 22 in the case of receiving a connection message Connect.

Meanwhile, the incoming call controller CLD for transmitting the ring-off message Ring_OFF to a called IP terminal at step 442 transmits a counterpart off-hook message opp_hof to the outgoing call controller CLG at step 450, and enters a conversation mode CONV. Then, the outgoing call controller CLG enters a conversation mode CONV according to the counterpart off-hook message opp_hof. In this case, the outgoing call controller CLG connects a calling legacy terminal to a port of the gateway card 26 by controlling a switch (not shown) in the IP-PBX 14, thereby making a call connection state between the calling legacy terminal and a called IP terminal.

As described above, in case of establishing a call path from a legacy terminal 16 to an IP terminal 18, the legacy terminal 16 has the same call origination method as a conventional legacy terminal, the called IP terminal automatically occupies a port of the gateway card 26, a user interface inside of the called IP terminal is controlled by the IP-PBX 14, and an IP network interface for voice communication is controlled by the IP driver 22. Herein, the voice communication is provided between the called IP terminal and the calling legacy terminal via the gateway card 26.

In the case (not shown) where a call path between a calling legacy terminal and a called IP terminal is formed to make a call connection state between them and then the calling legacy terminal enters an on-hook state, the outgoing call controller CLG, inside call control module 32, transmits a counterpart on-hook message (opp_hon) to the incoming call controller CLD. The incoming call controller CLD receiving the counterpart on-hook message (opp_hon) transmits a release request message (rls_request) to the called IP terminal in a call connection state via exchange interface 30. In this case, the called IP terminal transmits a release completion message (rls_complete) to IP driver 22 upon receiving the release request message (rls_request). The IP driver 22 receiving the release completion message (rls_complete) transmits a release message (rls) in compliance with a H.323 protocol procedure to the gateway controller, and transmits a release signal to the call control module 32 to release a call connection between the calling legacy terminal and the called IP terminal.

In the meantime, the Internet protocol telephony exchange system according to the present invention connects IP terminals 18 managed by the IP-PBX 14 and legacy terminals 16 with an IP network 12 in such a way that it can directly call another IP terminal of another IP network not managed by the IP-PBX 14. Such operations will be more clearly understood by the following description.

Call Control from IP Terminal to IP Trunk

Figure 5:
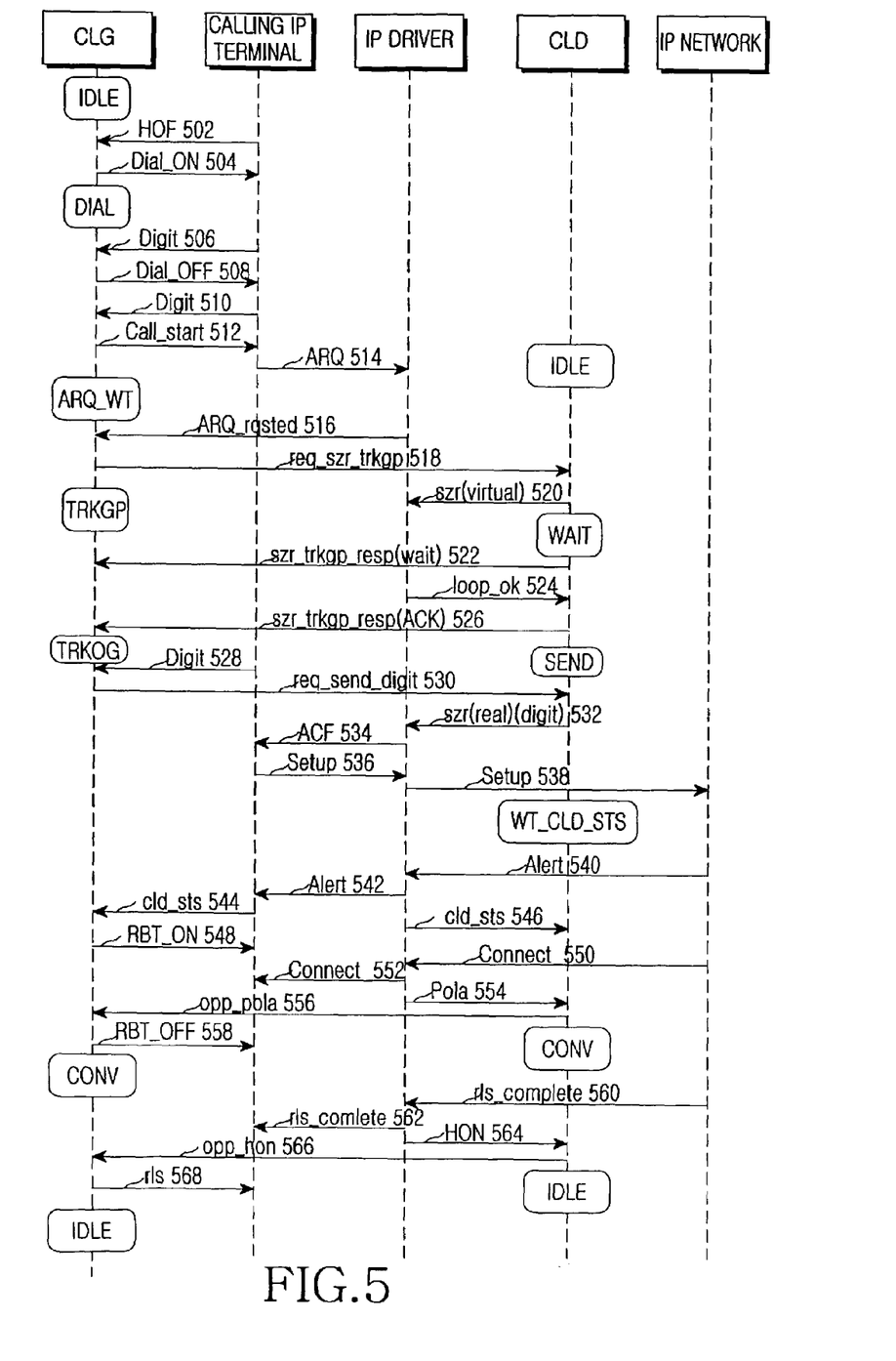
FIG. 5 is a flow chart illustrating a call control procedure of an Internet protocol telephony exchange system in case of establishing a call path from an IP terminal to an IP trunk in accordance with a preferred embodiment of the present invention.

A call control operation in case of establishing a call path from an IP terminal 18 to an IP trunk in an Internet protocol telephony exchange system shown in FIG. 1 will hereinafter be described with reference to FIG. 5 illustrating call control steps 502~568.

If at least one of the IP terminals 18 functioning as a calling IP terminal 18 enters an off-hook state to call another IP terminal (not shown) of a counterpart station connected to an IP network 12, then the calling IP terminal transmits an off-hook message HOF containing ID codes such as a port number which is assigned an extension number of an IP-PBX 14 to an exchange interface 30 via a hub 20, and the exchange interface 30 transmits the off-hook message HOF to the outgoing call controller CLG inside of call control module 32 at step 502.

The outgoing call controller CLG, initially in an idle mode IDLE, responds to the off-hook message HOF, and determines which one of IP terminals 18 generated an outgoing call. In this case, the outgoing call controller CLG recognizes a calling IP terminal 18 on the basis of IP identification codes (i.e., information such as a phone number and a port number) contained in the off-hook message HOF. Thereafter, the outgoing call controller CLG transmits a dial tone ON message Dial_ON to the calling IP terminal 18 via exchange interface 30 at step 504, and makes a transition to a dial mode DIAL. As a result, the calling IP terminal 18 generates a dial tone depending on the dial tone ON message Dial_ON.

Thereafter, if a user dials a phone number of a counterpart IP terminal of a counterpart station connected to an IP network 12 using a keypad mounted to the calling IP terminal 18, then the calling IP terminal 18 transmits dialed digit information Digit to the outgoing call controller CLG inside of the call control module 32 at step 506. Then the outgoing call controller CLG transmits a dial tone off message Dial_OFF to the calling IP terminal at step 508. If the calling IP terminal continuously transmits the remaining digit information Digit to the outgoing call controller CLG at step 510, then the outgoing call controller CLG transmits a call start message Call_start having dialing information (i.e., dialed digit information) to the calling IP terminal at step 512, and then makes a transition to an ARQ (Admission Request) waiting mode ARQ_WT. In this case, the calling IP terminal transmits an ARQ message having call information of the counterpart IP terminal to IP driver 22 at step 514.

Then, the IP driver 22 transmits an ARQ response message ARQ_rqsted in response to the ARQ message to the outgoing call controller CLG inside of the IP-PBX 14 via exchange interface 30 at step 516. The outgoing call controller CLG receives the ARQ response message ARQ_rqsted while in the ARQ waiting mode ARQ_WT, transmits an IP trunk occupancy request message req_szr_trkgp to the incoming call controller CLD at step 518, and enters an IP trunk occupancy mode TRKGP.

The incoming call controller CLD transmits a virtual IP trunk occupancy message szr_(virtual) to the IP driver 22 at step 520, enters a waiting mode WAIT, and transmits an IP trunk occupancy response waiting message szr_trkgp_resp (wait) to the outgoing call controller CLG at step 522.

In this case, if the IP driver 22 receiving the virtual IP trunk occupancy message szr_(virtual) transmits a loop message loop_ok to the incoming call controller CLD at step 524, then the incoming call controller CLD transmits an IP trunk occupancy response acknowledgment message szr_trkgp_resp(ACK) to the outgoing call controller CLG at step 526, and enters a transmission mode SEND. If the outgoing call controller CLG receives the IP trunk occupancy response acknowledgment message szr_trkgp_resp(ACK) from the incoming call controller CLD, then it enters a trunk calling mode TRKOG.

Under this condition, if the calling IP terminal 18 transmits digit information Digit to the outgoing call controller CLG at step 528, then the outgoing call controller CLG 530 transmits a digit transmission request message req_send_digit along with the digit information Digit to the incoming call controller CLD at step 530. The incoming call controller CLD transmits a trunk digit message szr(real)(digit) to the occupied IP driver 22 at step 532, and enters a termination-side state waiting mode WT_CLD_STS. Then, the IP driver 22 transmits an ACF message to the calling IP terminal 18 at step 534, and the calling IP terminal 18 transmits a setup message Setup to the IP driver 22 at step 536. Upon receiving the setup message Setup from the calling IP terminal 18, the IP driver 22 transmits a setup message Setup to IP network 12 at step 538, and thereby transmits call information to the counterpart IP terminal (i.e., a called IP terminal) having a corresponding IP address.

Thereafter, if the called IP terminal responds to the call information, the IP network 12 transmits an alert message Alert to the IP driver 22 at step 540, and then the IP driver 22 transmits the alert message Alert to the calling IP terminal 18 at step 542 and transmits a termination-side state message cld_sts to the incoming call controller CLD at step 546.

In this case, the calling IP terminal 18 also transmits a termination-side state message cld_sts to the outgoing call controller CLG at step 544. The incoming call controller CLD receives the termination-side state message cld_sts from the IP driver 22 at step 546, and the outgoing call controller CLG transmits a ring-back tone on message RBT_ON to the calling IP terminal 18 via exchange interface 30 at step 548, thereby enabling the calling IP terminal to generate a ring-back tone.

Under this condition, if a connection message Connect is transmitted from the IP network 12 to the IP driver 22 at step 550, then the IP driver 22 transmits the connection message Connect to the calling IP terminal 18 at step 552 to inform the calling IP terminal 18 of a connection state. Then, the IP driver 22 transmits a polarity message Pola to the incoming call controller CLD at step 554 to inform the call control module 32 of such connection state. The incoming call controller CLD transmits a counterpart polarity message opp_pola in response to the polarity message Pola to the outgoing call controller CLG at step 556, and then enters a conversation mode CONV. The outgoing call controller CLG responds to the counterpart polarity message opp_pola received from the incoming call controller CLD and transmits a ring-back tone off message RBT_OFF to the calling IP terminal 18 via exchange interface 30 at step 558, and enters a conversation mode CONV. Based on the aforementioned steps, the calling IP terminal 18 can establish voice communication with another IP terminal via the IP network 12. In this case, a call control procedure only is performed using the call control module 32 of the IP-PBX 14, but real voice communication is performed by the IP driver 22 via the IP network 12.

In such a call connection state, in the case where a call release completion message rls_complete is transmitted from a called IP terminal of a counterpart station to the IP driver 22 via the IP network 12 at step 560, the IP driver 22 transmits the call release completion message rls_complete to the calling IP terminal 18 at step 562 to perform a call release operation, and transmits an on-hook message HON to the incoming call controller CLD at step 564. The incoming call controller CLD transmits a counterpart on-hook message opp_hon to the outgoing call controller CLG at step 566, and makes a transition to an idle mode IDLE. The outgoing call controller CLG transmits a release message rls to the calling IP terminal via the exchange interface 30 at step 568, thereby completely releasing a call connection between an IP terminal 18 and an IP trunk, and then enters an idle mode IDLE. Herein, the calling IP terminal 18 makes a transition to an on-hook state upon receiving the release message rls.

As described above, in case of establishing a call connection from an IP terminal 18 connected to the IP-PBX 14 to another IP terminal (not shown) connected to the IP network 12 in an Internet protocol telephony exchange system in accordance with the present invention, user information such as off-hook/dialing information of a calling IP terminal 18 is applied to the IP-PBX 14 via exchange interface 30, and then call control module 32 analyzes a counterpart terminal's number. The call control module 32 controls an IP trunk of the IP network 12 because a counterpart terminal is an IP terminal, interfaces with the IP network 12 for voice communication, and thereby establishes a call connection with another IP terminal connected to the IP network 12.

Call Control from Legacy Terminal to IP Trunk

Figure 6:
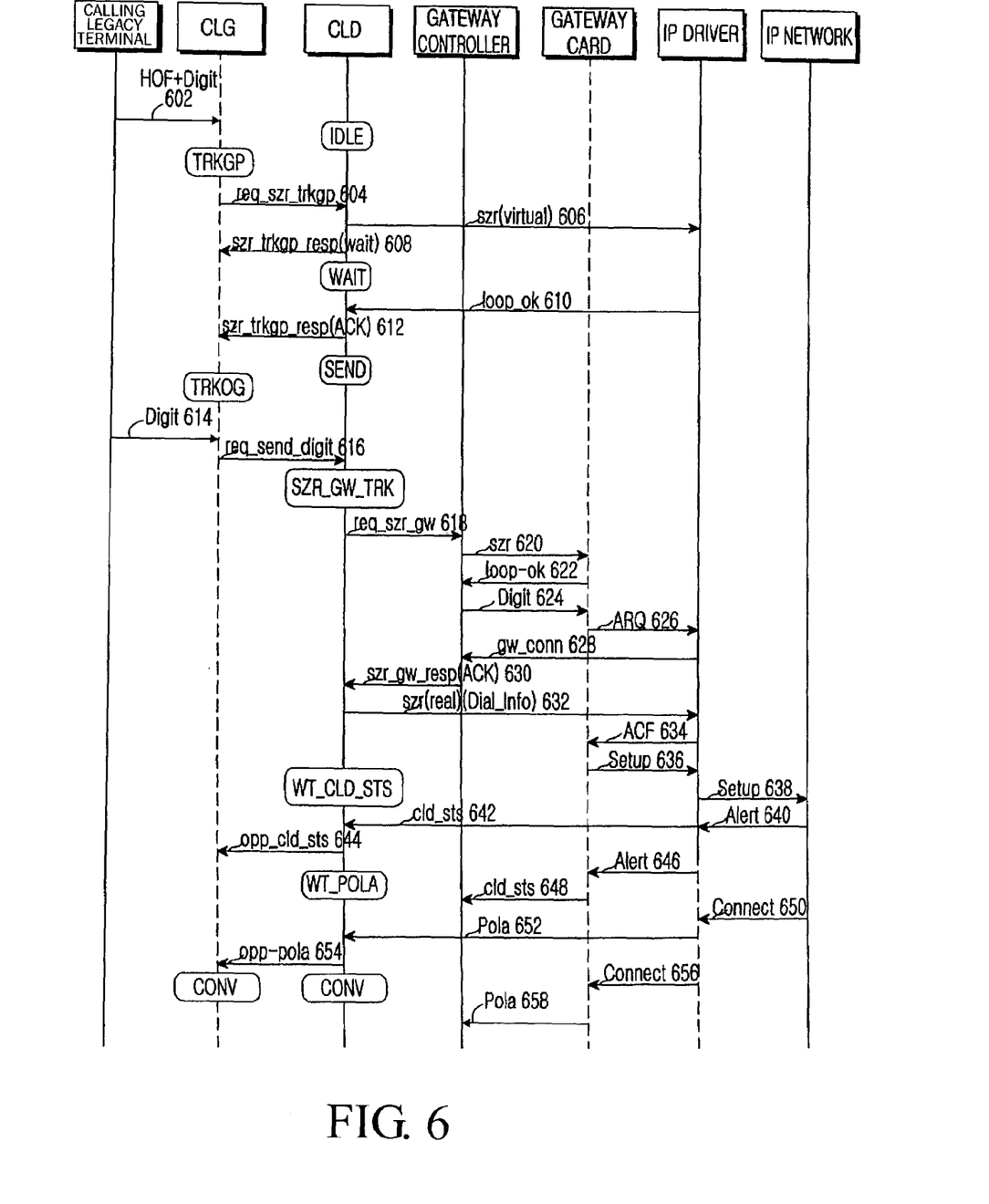
FIG. 6 is a flow chart illustrating a call control procedure of an Internet protocol telephony exchange system in case of establishing a call path from a legacy terminal to an IP trunk in accordance with a preferred embodiment of the present invention.

A call control operation in case of establishing a call path from a legacy terminal 16 to an IP trunk in an Internet protocol telephony exchange system shown in FIG. 1 will hereinafter be described with reference to FIG. 6 illustrating call control steps 602~658.

In the case where at least one of legacy terminals 16 enters an off-hook state to call another IP terminal (not shown) connected to IP network 12 and then the legacy terminal 16 dials a prefix for occupying a gateway channel of a gateway card 26, an off-hook message HOF and digit information Digit are transmitted to the outgoing call controller CLG at step 602. The outgoing call controller CLG enters a trunk occupancy mode TRKGP, and then transmits an IP trunk occupancy request message req_szr_trkgp to the incoming call controller CLD at step 604. Upon receiving the IP trunk occupancy request message req_szr_trkgp from the outgoing call controller CLG, the incoming call controller CLD, initially in an idle mode IDLE, transmits an IP trunk occupancy message szr(virtual) for occupying a virtual office line (i.e., an IP trunk) to an IP driver 22 at step 606, transmits an IP occupancy response waiting message szr_trkgp_resp(wait) to the outgoing call controller CLG at step 608, and then enters a waiting mode WAIT.

Under this condition, in the case where the IP driver 22 receiving the IP trunk occupancy message szr(virtual) occupies a virtual IP trunk of the IP network 12 and transmits a loop message loop_ok to the incoming call controller CLD at step 610, the incoming call controller CLD transmits an IP occupancy response acknowledgment message szr_trkgp_resp(ACK) to the outgoing call controller CLG at step 612, and then enters a transmission mode SEND.

The outgoing call controller CLG receiving the IP occupancy response acknowledgment message szr_trkgp_resp(ACK) enters a trunk calling mode TRKOG. Thereafter, if digit information Digit to be transmitted from a calling legacy terminal 16 to the IP network 12 is transmitted to the outgoing call controller CLG at step 614, the outgoing call controller CLG transmits a digit transmission request message req_send_digit to the incoming call controller CLD at step 616. Upon receiving digit transmission request message req_send_digit from the outgoing call controller CLG, the incoming call controller CLD enters a trunk gateway occupancy mode SZR_GW_TRK, and transmits a gateway channel occupancy request message req_szr_gw to a gateway controller at step 618.

Upon receiving the gateway channel occupancy request message req_szr_gw from the incoming call controller CLD, the gateway controller transmits a gateway channel occupancy message szr to the gateway card 26 at step 620. The gateway card 26 occupies a gateway channel in response to the gateway channel occupancy message szr, and transmits a loop message loop_ok to a gateway controller at step 622. If the gateway controller transmits digit information Digit corresponding to a phone number or IP address of a counterpart IP terminal to the gateway card 26 at step 624 upon receiving the loop message loop_ok, then the gateway card 26 converts the digit information Digit into an ARQ message and transmits the ARQ message to the IP driver 22 at step 626.

The IP driver 22 then transmits a gateway channel connection message gw_conn for indicating a gateway channel connection to the gateway controller at step 628 upon receiving the ARQ message. The gateway controller transmits a gateway channel occupancy response acknowledgement message szr_gq_resp(ACK) to the incoming call controller CLD at step 630. Then, the incoming call controller CLD transmits dial information szr(real)(Dial_Info) to be transmitted to a physically-connected IP line to the IP driver 22 via the exchange interface 30 at step 632, and enters a termination-side waiting mode WT_CLD_STS.

In this case, the IP driver 22 transmits an ACF message to the gateway card 26 at step 634. The gateway card 26 transmits a setup message Setup based on a H.323 protocol to the IP driver 22 at step 636, and then the IP driver 22 transmits the setup message Setup to the IP network 12 at step 638. The setup message Setup is transmitted to the counterpart IP terminal in compliance with a TCP/IP protocol.

In the case where the counterpart IP terminal responds to the setup message Setup and the IP network 12 transmits an alert message Alert to the IP driver 22 at step 640, the IP driver 22 transmits a termination-side state message cld_sts to the incoming call controller CLD at step 642. The incoming call controller CLD transmits a counterpart state message opp_cld_sts, in response to the termination-side state message cld_sts, to the outgoing call controller CLG at step 644, and makes a transition to a polarity waiting mode WT_POLA.

Then, the IP driver 22 transmits the alert message Alert to the gateway card 26 at step 646. The gateway card 26 analyzes the alert message Alert, and transmits the termination-side state message cld_sts to the gateway controller at step 648. Thereafter, if a connection message Connect is received from the IP network 12, then the IP driver 22 transmits a polarity message Pola to the incoming call controller CLD at step 652, and transmits the connection message Connect to the gateway card 26 at step 656. In this case, the gateway card 26 transmits a polarity message Pola to the gateway controller.

The incoming call controller CLD transmits a counterpart polarity message opp_pola to the outgoing call controller CLG at step 654, and then enters a conversation mode CONV. The outgoing call controller CLG also enters the conversation mode CONV upon receiving the counterpart polarity message opp_pola from the incoming call controller CLD, thereby establishing a call connection state between a calling legacy terminal 16 and a called IP terminal of the IP network 12.

As described above, in case of establishing a call path from a legacy terminal 16 to the IP network 12, the legacy terminal 16 has the same call origination method as a conventional legacy terminal, and the IP driver 22 is connected to the IP network 12 by automatically occupying a port of a gateway card 26 in such a way that a call control procedure is performed.

As apparent from the above description, since an IP terminal and a legacy terminal are operated as terminals in a single exchange system in the present invention, a call path between the IP terminal and the legacy terminal can be controlled as a general extension call, i.e., an intra-office call. Also, since the same number system is assigned to the IP terminal and the legacy terminal, the IP terminal and the legacy terminal can be integrated in a single system to provide an integrated call service. Since a call connection mode between the IP terminal and the legacy terminal is easily provided without using a prefix between them, maintenance of the IP terminal is facilitated. Further, since all user interfaces contained in a conventional legacy terminal are provided to the IP terminal, a user need not discriminate between the IP terminal and a general legacy terminal, thereby further facilitating a call connection between an IP network and a PSTN.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An Internet protocol telephony exchange system connected to an IP (Internet Protocol) network and a PSTN (Public Switched Telephone Network), for performing call control services of legacy terminals and IP terminals by controlling an Internet Protocol and an exchange call control procedure, comprising:
    at least one IP terminal connected to the IP network, for containing a user interface which generates user information or converts received user interface information into information of a user-identifiable state, and performing a VoIP (Voice over Internet Protocol) function in compliance with a predetermined data communication protocol procedure;
    an IP driver connected to the IP network, for controlling an IP end point at which the IP terminals are positioned, upon receiving IP terminal connection information and call control information based on the data communication protocol procedure; and
    an IP-PBX (Internet Protocol-Private Branch Exchange) including: a database having subscriber information including phone numbers of a plurality of legacy terminals and the IP terminals, port numbers, and IP address information; an exchange interface connected to the IP network, for receiving the user information from the IP terminals, and transmitting call control information to the IP driver and the IP terminals over the IP network; a gateway card connected to the IP network, for establishing a traffic channel between the IP terminals and the legacy terminals upon receiving IP terminal connection information based on the data communication protocol procedure and call control information; and a call control module for searching the database on the basis of call origination information transmitted from the IP terminals and the legacy terminals, analyzing a termination-side number, and establishing a call connection service with the legacy terminals or the IP terminals via the exchange interface, the gateway card, and the IP driver, such that when the IP terminals generate user information, the call control module provides the IP terminals with a variety of tone and user interface information for controlling the IP terminals by analyzing phone numbers and port numbers of the IP terminals in such a way that the IP terminals generate call signals in the same number system as the legacy terminals.

2. The Internet protocol telephony exchange system as set forth in claim 1, wherein user information, including a phone number and a port number, is transmitted from the user interface inside of the IP terminals to the exchange interface when the IP terminals enter an off-hook state.

3. The Internet protocol telephony exchange system as set forth in claim 2, wherein the call control module automatically occupies a channel of the gateway card on the basis of a counterpart analysis result when a first IP terminal or a first legacy terminals attempt a call connection with a second legacy terminal or a second IIP terminal, respectively, and forms a voice communication path between the second legacy terminal or the second IP terminal.

4. The Internet protocol telephony exchange system as set forth in claim 2, wherein the predetermined data communication protocol procedure is one of an H.323 recommended by an ITU-T (International Telecommunication Union-Telecommunication) Standardization Sector, a media gateway control protocol (MGCP) used between a media gateway and a media gateway controller for controlling the media gateway and a SIP (Session Initiation Protocol) being multimedia telecommunication standards for data, voice, and video signals.

5. The Internet protocol telephony exchange system as set forth in claim 1, wherein the call control module automatically occupies a channel of the gateway card on the basis of a counterpart analysis result when a first IP terminal or a first legacy terminals attempt a call connection with a second legacy terminal or a second IP terminal, respectively, and forms a voice communication path between the second legacy terminal or the second IP terminal.

6. The Internet protocol telephony exchange system as set forth in claim 1, further comprised of:
    providing the IP driver with an IF call access control signal if the corresponding phone number is a prefix for accessing the IP network in the step (a);
    providing the calling IP terminal with the user interface information to generate a ring-back tone; and
    providing a call path of the IP network according to an IP call connection of the IP driver.

7. The Internet protocol telephony exchange system as set forth in claim 1, further comprised of:

when retrieving terminal information of a corresponding phone number, occupying a gateway channel when the corresponding phone number is a prefix for accessing the IP network; and providing the IP driver with an IP call connection control signal to establish an IP call connection of the IP driver, and forming a call path between the IP network and the legacy terminal via the gateway channel.

8. An Internet protocol telephony exchange system connected to an IP (Internet Protocol) network and a PSTN (Public Switched Telephone Network), for performing a call control service between a legacy terminal and an IP terminal by controlling an Internet Protocol and an exchange call control procedure, comprising:

a hub connected to the IP network, for containing a plurality of LAN (Local Area Network) ports therein, and switchably connecting LAN devices connected to the LAN ports;

at least one IP terminal connected to the hub, for containing a user interface which generates user information, such as hook state information having ID codes and digit information, or converts received user interface information such a variety of tone messages into information of a user-identifiable state, and performing a VoIP (Voice over Internet Protocol) function in compliance with a predetermined data communication protocol procedure;

an IP driver connected to the hub, for controlling an IP end point at which the P terminals are positioned, upon receiving IP terminal connection information and call control information based on the data communication protocol procedure; and an IP-PBX including: a database having subscriber information such as phone numbers of a plurality of legacy terminals and the IP terminals, port numbers, and IP address information; an exchange interface connected to the hub, for receiving the user information from the IP terminals, and transmitting call control information to the IP driver and the IP terminals over the hub; a gateway card connected to the hub, for establishing a traffic channel between the IP terminals and the legacy terminals upon receiving IP terminal connection information based on the data communication protocol procedure and call control information; and a call control module for searching the database on the basis of call origination information transmitted from the IP terminals and the legacy terminals, analyzing a termination-side number, and establishing a call connection service with the legacy terminals or the IP terminals via the exchange interface, the gateway card, and the IP driver.

9. The Internet protocol telephony exchange system as set forth in claim 8, wherein the predetermined data communication protocol procedure is one of an H.323 recommended by an ITU-T (International Telecommunication Union-Telecommuncation) Standardization Sector, a media gateway control protocol (MGCP) used between a media gateway and a media gateway controller for controlling the media gateway and a SIP (Session Initiation Protocol) being multimedia telecommunication standards for data, voice, and video signals.

10. The Internet protocol telephony exchange system as set forth in claim 8, wherein the user information, including a phone number and a port number, is transmitted from the user interface inside of the IP terminals to the exchange interface when the IP terminals enter an off-hook state.

11. The Internet protocol telephony exchange system as set forth in claim 10, wherein the call control module automatically occupies a channel of the gateway card on the basis of a counterpart analysis result when the W terminals or the legacy terminals attempt to a call connection with a heterogeneous terminal, and forms a voice communication path between heterogeneous terminals.

12. The Internet protocol telephony exchange system as set forth in claim 8, wherein the call control module automatically occupies a channel of the gateway card on the basis of a counterpart analysis result when the IP terminals or the legacy terminals attempt to a call connection with a heterogeneous terminal, and forms a voice communication path between heterogeneous terminals.

13. A method for controlling a call control procedure of the Internet protocol telephony exchange system connected to an Internet Protocol(IP) network and a Public Switched Telephone Network(PSTN), for performing call control services of legacy terminals and IP terminals by controlling an Internet Protocol and an exchange call control procedure, comprising the steps of:

analyzing a calling IP terminal"s user information received, detecting a phone number and a port number of the calling lIP terminal on the basis of the analyzed result, and retrieving terminal information of a corresponding phone number when a counterpart phone number transmitted from the calling IP terminal is call information stored in the database, the database having phone numbers of the legacy terminals and the IP terminals and terminal information corresponding to the nhone numbers; and providing the calling IP terminal and a called IP terminal with the user interface information to generate a ring-back tone and a ring sound if the terminal information of the corresponding phone number corresponds to an IP terminal, and providing a call path of an IP network between the calling IP terminal and the called IP terminal if user information corresponding to an off-hook state is received from the called IP terminal.

14. The method as set forth in claim 13, further comprising the steps of:

providing the calling IP terminal with the user interface information to generate a ring-back tone if the corresponding phone number is a prefix for accessing the IP network; and providing a call path between the IP network and the IP terminal.

15. The method as set forth in claim 13, wherein user information, including a phone number and a port number, is transmitted from user interface inside of the IP terminals to an exchange interface when the IP terminals enter an off-hook state.

16. The method as set forth in claim 15, wherein a call control module automatically occupies a channel of a gateway card on the basis of a counterpart analysis result when a first IP terminal or a first legacy terminal attempt a call connection with a second legacy terminal or a second IP terminal, respectively, and forms a voice communication path between the second legacy terminal or the second IP terminal.

17. The method as set forth in claim 15 further comprising, performing a VoIP (Voice over IP) function in compliance with a predetermined data communication protocol procedure, said predetermined data communication protocol procedure being one of an H.323 recommended by an ITU-T (International Telecommunication Union-Telecommunication) Standardization Sector, a media gateway control protocol (MGCP) used between a media gateway and a media gateway controller for controlling the media gateway and a SIP (Session Initiation Protocol) being multimedia telecommunication standards for data, voice, and video signals.

18. The method as set forth in claim 13, wherein a call control module automatically occupies a channel of a gateway card on the basis of a counterpart analysis result when a first lip terminal or a first legacy terminal attempt a call connection with a second legacy terminal or a second IP terminal, respectively, and forms a voice communication path between the second legacy terminal or the second IP terminal.

19. A method for controlling a call control procedure of the Internet protocol telephony exchange system connected to an Internet Protocol(IP) network and a Public Switched Telephone Network(PSTN), for performing call control services of legacy terminals and IP terminals by controlling an Internet Protocol and an exchange call control procedure, comprising the steps of:

retrieving terminal information of a corresponding phone number when a counterpart phone number transmitted from the legacy terminal is call information stored in the database, the database having phone numbers of the legacy terminals and the if terminals and terminal information corresponding to the phone numbers;

occupying a gateway channel by responding to a case where the terminal information of the corresponding phone number is an if terminal, providing a called IP terminal with the user interface information simultaneously with providing the legacy terminal with a ring-back tone, and generating a ring sound; and interrupting user interface information provided to the called IP terminal if user information corresponding to an off-hook state is received from the called IP terminal, and providing a call path between the legacy terminal and the called IP terminal via the gateway channel.

20. The method as set forth in claim 19, further comprising the steps of:

occupying a gateway channel if the corresponding phone number is a prefix for accessing the IP network; and providing a call path between the IP network and the legacy terminal via the gateway channel.

* * * * *